N. P. CHANEY.
FEATHER-RENOVATOR.

No. 174,412. Patented March 7, 1876.

WITNESSES:
E. Wolff
John Goethals

INVENTOR:
N. P. Chaney
BY
ATTORNEYS.

UNITED STATES PATENT OFFICE.

NATHAN P. CHANEY, OF POTSDAM, NEW YORK.

IMPROVEMENT IN FEATHER-RENOVATORS.

Specification forming part of Letters Patent No. 174,412, dated March 7, 1876; application filed January 15, 1876.

*To all whom it may concern:*

Be it known that I, NATHAN P. CHANEY, of Potsdam, in the county of St. Lawrence and State of New York, have invented a new and Improved Feather-Renovator, of which the following is a specification:

My invention consists of a hollow drum for holding the feathers, constructed in two parts, of which the upper one is detachable and reversible for convenience in operating the machine, and in the lower part is a perforated tube for introducing the steam, and a canal for carrying off the water of condensation, the canal being covered by a wire screen to prevent the feathers from falling into it. The drum also contains a revolving shaft with arms for stirring the feathers, and there is a steam-jacket to the lower part, to which steam is admitted from a suitable boiler.

Figure 1:
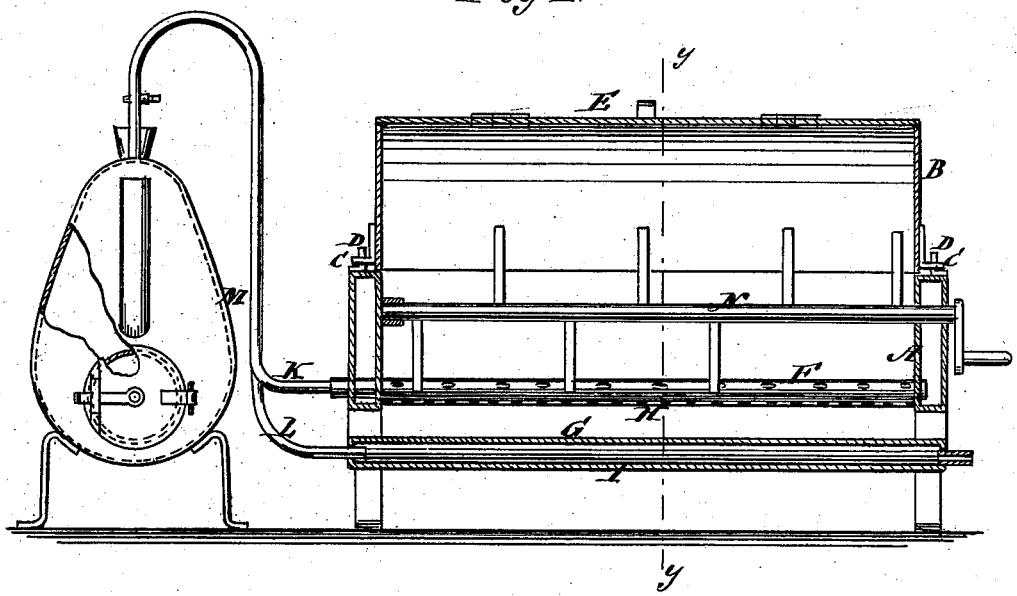
Figure 2:
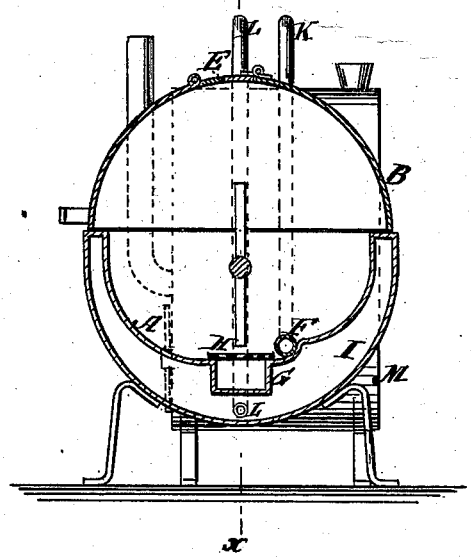

Figure 1 is a longitudinal sectional elevation of my improved feather-renovator, taken on the line *x x* of Fig. 2. Fig. 2 is a transverse section, taken on line *y y* of Fig. 1.

Similar letters of reference indicate corresponding parts.

A is the lower part, and B the upper part, of the hollow drum in which the feathers are placed to be steamed, said parts being made separately, and connected by placing the upper one on the lower one, with the lugs C of the former in the notched flange D of the latter, whereby they are detachably connected, so that the top can be readily taken off when required for taking out the feathers. The part B has a door, E, in the top for putting in the feathers, and for letting the steam escape. In the lower part of the part A is a perforated pipe, F, for letting in and distributing the steam, and in the bottom is a canal, G, for the condensed water to flow out, said canal being covered with a wire screen, H, to keep the feathers out. I is the jacket to the lower part of the drum, for heating by steam to dry off the feathers after they have been steamed. K and L are steam-pipes for admitting steam from the boiler M; and N is the revolving shaft with arms for stirring the feathers.

Having thus described my invention, I claim as new and desire to secure by Letters Patent—

In feather-renovators, the combination of section A, provided with lugs C, covered sediment-chamber G, steam-pipes F L, heating-chamber I, and shaft N, having agitating-arms, with the section B, provided with notched flanges D, and door E, all substantially as shown and described.

NATHAN P. CHANEY.

Witnesses:
J. A. HALE,
P. J. HOUGHTON.